US012757096B2

(12) United States Patent
Teyeb et al.

(10) Patent No.: US 12,757,096 B2
(45) Date of Patent: Oct. 6, 2026

(54) METHODS FOR CONDITIONAL HANDOVER

(71) Applicant: INTERDIGITAL PATENT HOLDINGS, INC., Wilmington, DE (US)

(72) Inventors: Oumer Teyeb, Montreal (CA); Martino Freda, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 149 days.

(21) Appl. No.: 18/293,412

(22) PCT Filed: Aug. 3, 2022

(86) PCT No.: PCT/US2022/039319
§ 371 (c)(1),
(2) Date: Jan. 30, 2024

(87) PCT Pub. No.: WO2023/014822
PCT Pub. Date: Feb. 9, 2023

(65) Prior Publication Data
US 2024/0373299 A1 Nov. 7, 2024

Related U.S. Application Data

(60) Provisional application No. 63/228,916, filed on Aug. 3, 2021.

(51) Int. Cl.
*H04W 36/36* (2009.01)
*H04W 36/00* (2009.01)
(Continued)

(52) U.S. Cl.
CPC ..... *H04W 36/362* (2023.05); *H04W 36/0058* (2018.08); *H04W 36/0085* (2018.08); *H04W 36/08* (2013.01); *H04W 36/24* (2013.01)

(58) Field of Classification Search
CPC ........... H04W 36/362; H04W 36/0058; H04W 36/0085; H04W 36/08; H04W 36/24;
(Continued)

(56) References Cited

U.S. PATENT DOCUMENTS 9,350,442 B2 * 5/2016 Ohm .................. H04B 7/18506
10,149,223 B2 * 12/2018 Guo ...................... H04W 72/51
(Continued)

FOREIGN PATENT DOCUMENTS

WO 2020069664 A1 4/2020
WO 2020262123 A1 12/2020
WO 2021150054 A1 7/2021

OTHER PUBLICATIONS

Third Generation Partnership Project, "Technical Specification Group Radio Access Network; NR; NR and NG-RAN Overall Description; Stage 2 (Release 16)," 3GPP TS 38.300 V16.2.0 (Jul. 2020).
(Continued)

*Primary Examiner* — Joshua L Schwartz
(74) *Attorney, Agent, or Firm* — Volpe Koenig

(57) ABSTRACT

Methods and apparatuses for conditional handover (CHO) are provided herein. CHO configuration information identifying CHO candidate cells may be received. The CHO configuration information may indicate CHO trigger conditions associated with the CHO candidate cells, measurement trigger conditions associated with non-CHO candidate cells, and measurement reporting eligibility criteria associated with a serving cell. If a CHO trigger condition is fulfilled, and if a measurement trigger condition is fulfilled, and if the serving cell does not meet the measurement reporting eligibility criteria, a handover procedure may be executed towards the CHO candidate cell for which the CHO trigger
(Continued)

condition is fulfilled. The method may include sending a message indicating completion of the handover procedure and reporting a signal measurement associated with a non-candidate cell. If the serving cell meets the measurement reporting eligibility criteria, the method may include refraining from executing the CHO while still reporting the signal measurement.

20 Claims, 10 Drawing Sheets

(51) Int. Cl.
*H04W 36/08* (2009.01)
*H04W 36/24* (2009.01)

(58) Field of Classification Search
CPC ............ H04W 24/10; H04W 36/0005; H04W 36/00837; H04W 36/30
See application file for complete search history.

(56) References Cited

U.S. PATENT DOCUMENTS

| | | | | |
|---|---|---|---|---|
| 12,477,413 | B2 * | 11/2025 | Liu | H04W 36/0058 |
| 2015/0172985 | A1 * | 6/2015 | Gangadhar | H04W 36/322 370/332 |
| 2020/0351735 | A1 | 11/2020 | Latheef et al. | |
| 2021/0051537 | A1 | 2/2021 | Zhang et al. | |
| 2022/0322174 | A1 * | 10/2022 | Da Silva | H04W 76/19 |
| 2025/0031116 | A1 * | 1/2025 | Kim | H04W 36/08 |
| 2025/0247759 | A1 * | 7/2025 | Fahim | H04W 36/00838 |
| 2025/0365802 | A1 * | 11/2025 | Jung | H04W 8/183 |

OTHER PUBLICATIONS

Third Generation Partnership Project, "Technical Specification Group Radio Access Network; NR; NR and NG-RAN Overall Description; Stage 2 (Release 16)," 3GPP TS 38.300 V16.6.0 (Jun. 2021).

Third Generation Partnership Project, "Technical Specification Group Radio Access Network; NR; NR and NG-RAN Overall Description; Stage 2 (Release 16)," 3GPP TS 38.300 V16.9.0 (Jun. 2022).

Third Generation Partnership Project, "Technical Specification Group Radio Access Network; NR; NR and NG-RAN Overall Description; Stage 2 (Release 17)," 3GPP TS 38.300 V17.1.0 (Jun. 2022).

Third Generation Partnership Project, "Technical Specification Group Radio Access Network; NR; Radio Resource Control (RRC) protocol specification (Release 16)," 3GPP TS 38.331 V16.2.0 (Sep. 2020).

Third Generation Partnership Project, "Technical Specification Group Radio Access Network; NR; Radio Resource Control (RRC) protocol specification (Release 16)," 3GPP TS 38.331 V16.5.0 (Jun. 2021).

Third Generation Partnership Project, "Technical Specification Group Radio Access Network; NR; Radio Resource Control (RRC) protocol specification (Release 17)," 3GPP TS 38.331 V17.1.0 (Jun. 2022).

Third Generation Partnership Project, "Technical Specification Group Radio Access Network; NR; Radio Resource Control (RRC) protocol specification (Release 16)," 3GPP TS 38.331 V16.9.0 (Jun. 2022).

* cited by examiner

METHODS FOR CONDITIONAL HANDOVER

CROSS-REFERENCE TO RELATED APPLICATIONS

This application is the U.S. National Stage, under 35 U.S.C. § 371, of International Application No. PCT/US2022/039319 filed Aug. 3, 2022, which claims the benefit of U.S. Provisional Application No. 63/228,916, filed Aug. 3, 2021, the contents of which are incorporated herein by reference.

BACKGROUND

Release 16 of the Third Generation Partnership Project (3GPP) New Radio (NR) standards introduced the concept of conditional handover (CHO) and conditional PSCell Addition/Change (also known as CPA/CPC, and collectively referred to as CPAC), with a goal of reducing the likelihood of radio link failures (RLF) and handover failures (HOF).

Legacy Long-Term Evolution (LTE)/NR handover procedures may be triggered by measurement reports, even though there may be nothing preventing the network from sending a HO command to a WTRU even without receiving a measurement report. For example, a WTRU may be configured to monitor for an event that triggers the sending of a measurement report when the radio signal level or quality (reference signal received power (RSRP), reference signal receive quality (RSRQ), etc.) of a neighbor cell becomes better than the radio signal level or quality of a Primary serving cell (PCell) or also the Primary Secondary serving Cell (PSCell), in the case of Dual Connectivity (DC). The WTRU may monitor radio conditions at the serving and neighbor cells and send a measurement report when the triggering conditions are fulfilled. When such a report is received, the network (e.g., a current serving node/cell) may prepare the HO command, which may be an RRC Reconfiguration message and may include a reconfigurationWithSync message) and send it to the WTRU, and the WTRU may execute it immediately resulting in the WTRU connecting to the target cell.

SUMMARY

Methods and apparatuses for conditional handover (CHO) are provided herein. CHO configuration information identifying CHO candidate cells may be received. The CHO configuration information may indicate CHO trigger conditions associated with the CHO candidate cells, measurement trigger conditions associated with non-CHO candidate cells, and measurement reporting eligibility criteria associated with a serving cell. If a CHO trigger condition is fulfilled, and if a measurement trigger condition is fulfilled, and if the serving cell does not meet the measurement reporting eligibility criteria, a handover procedure may be executed towards the CHO candidate cell for which the CHO trigger condition is fulfilled. The method may include sending a message indicating completion of the handover procedure and reporting a signal measurement associated with a non-candidate cell. If the serving cell meets the measurement reporting eligibility criteria, the method may include refraining from executing the CHO while still reporting the signal measurement.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
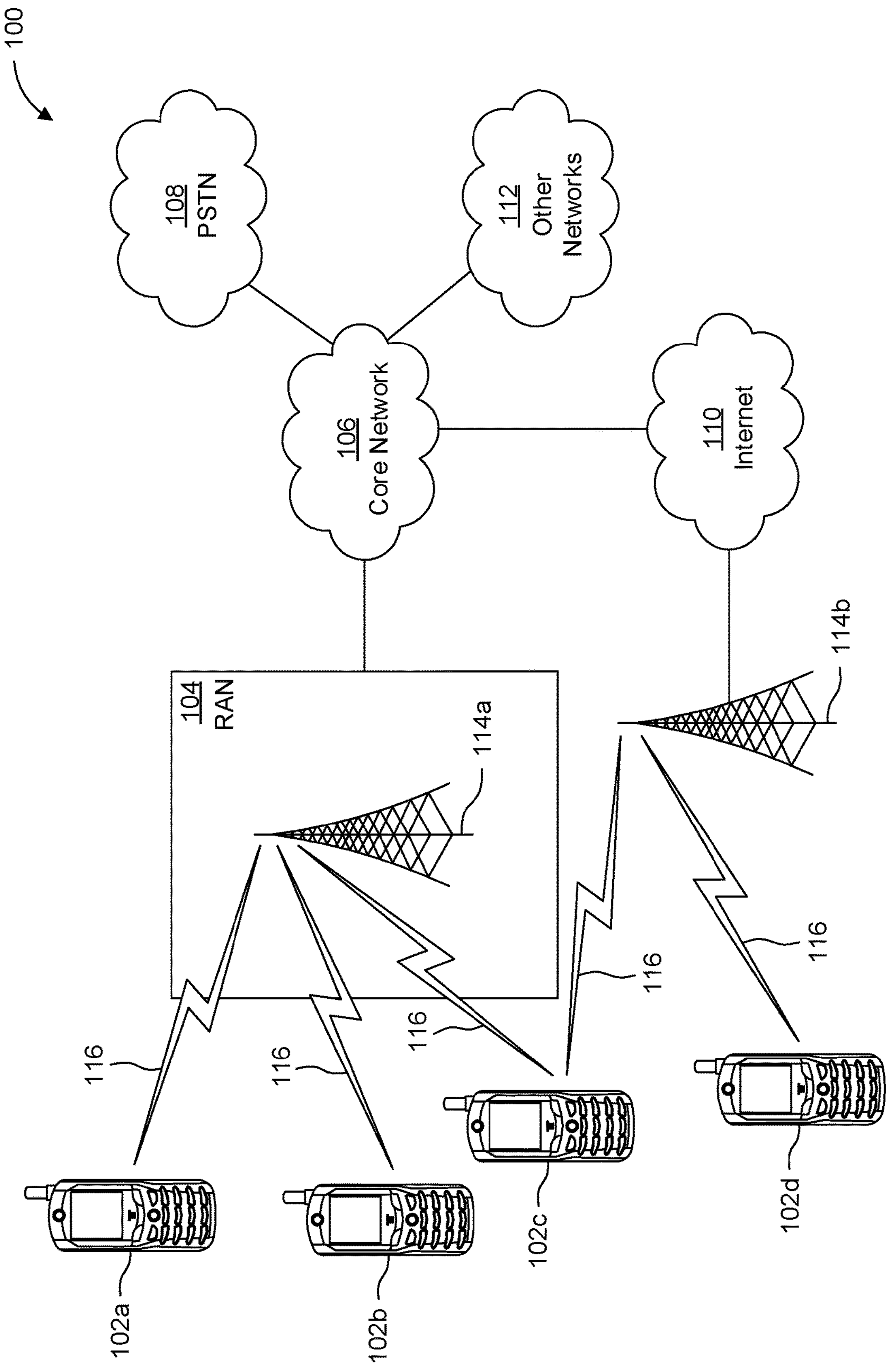
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
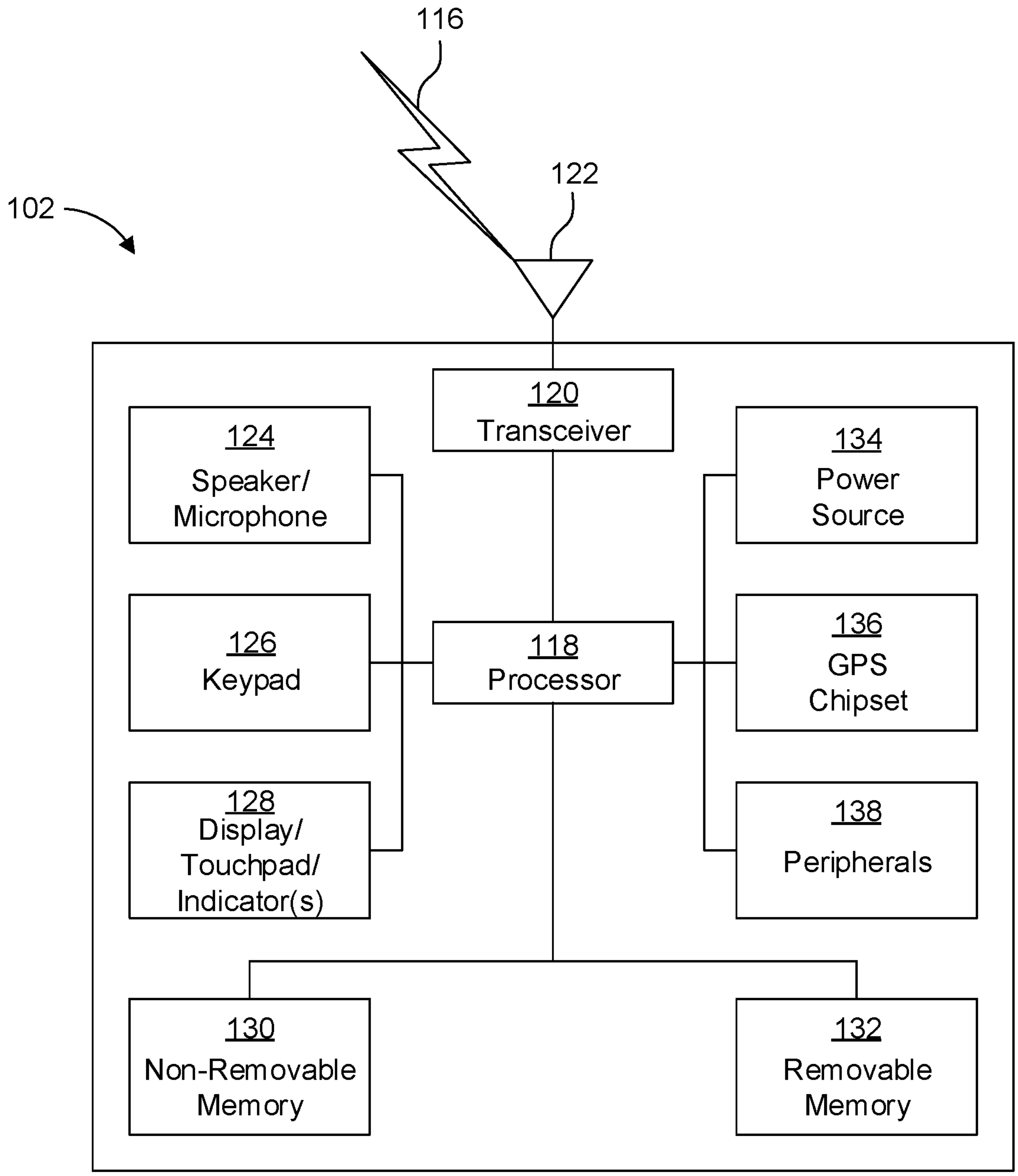
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
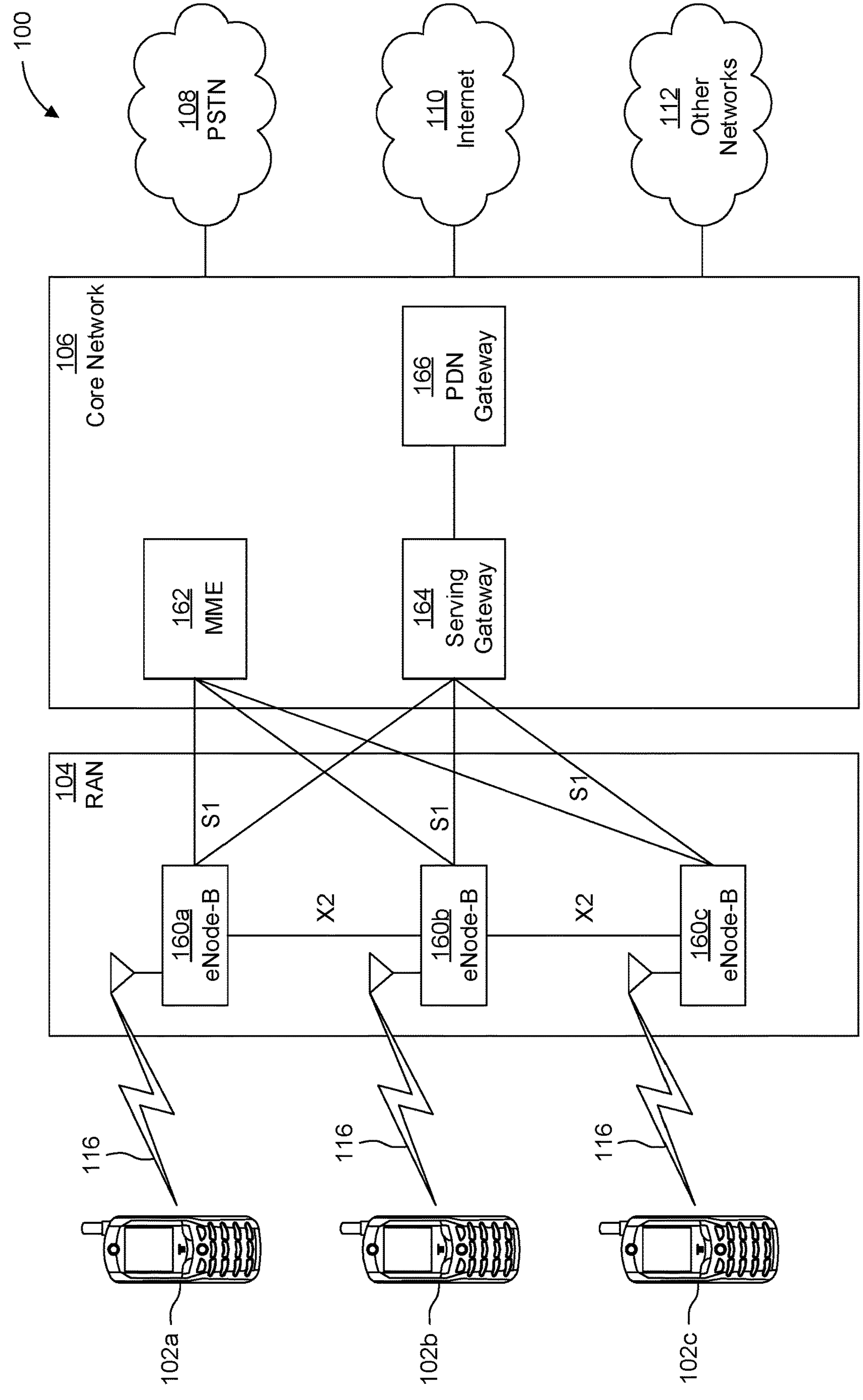
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
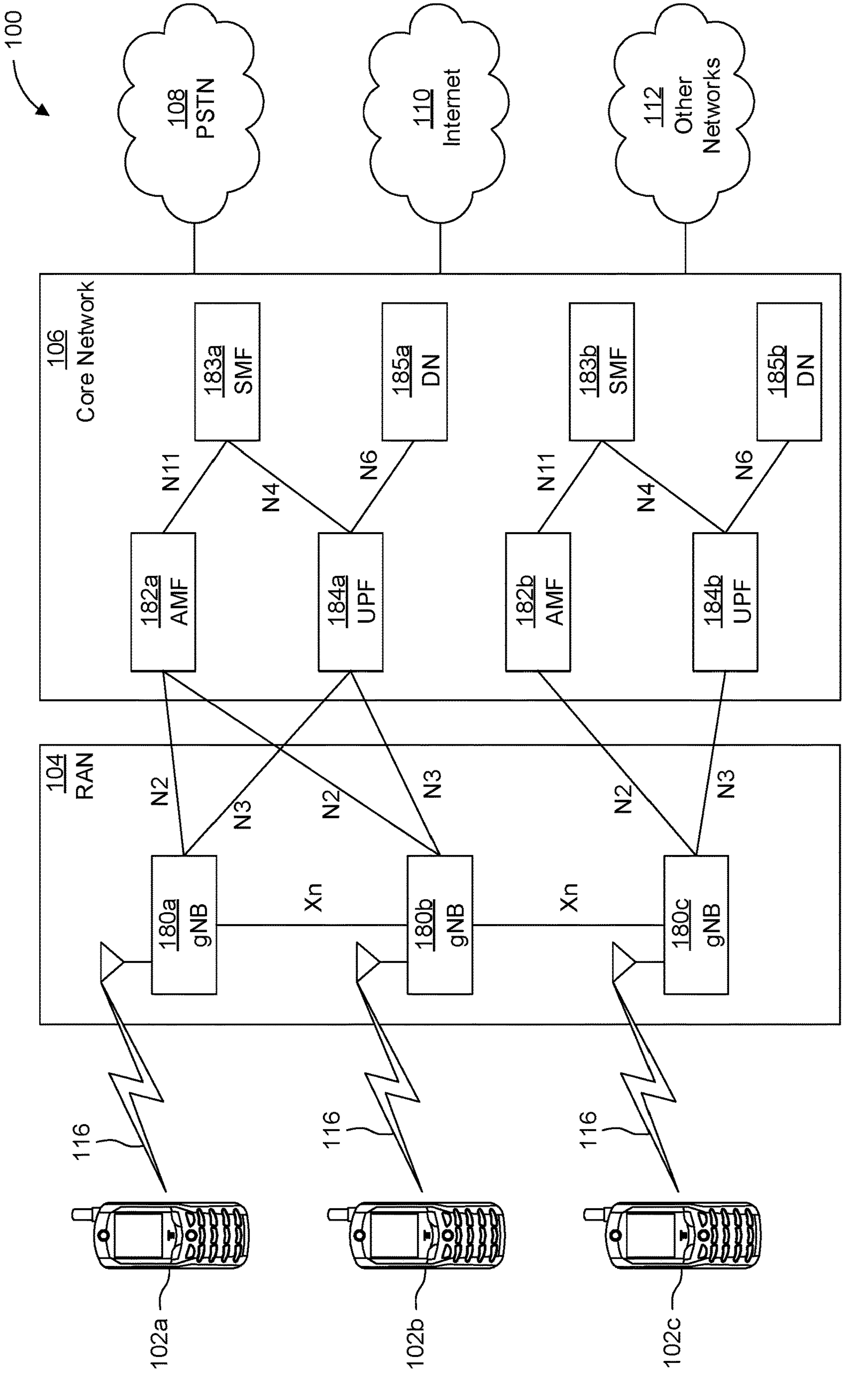
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a,* 160*b,* 160*c* substantially simultaneously. In the non-standalone configuration, eNode-Bs 160*a,* 160*b,* 160*c* may serve as a mobility anchor for WTRUs 102*a,* 102*b,* 102*c* and gNBs 180*a,* 180*b,* 180*c* may provide additional coverage and/or throughput for servicing WTRUs 102*a,* 102*b,* 102*c.*

Each of the gNBs 180*a,* 180*b,* 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a,* 184*b,* routing of control plane information towards Access and Mobility Management Function (AMF) 182*a,* 182*b* and the like. As shown in FIG. 1D, the gNBs 180*a,* 180*b,* 180*c* may communicate with one another over an Xn interface.

The CN 106 shown in FIG. 1D may include at least one AMF 182*a,* 182*b,* at least one UPF 184*a,* 184*b,* at least one Session Management Function (SMF) 183*a,* 183*b,* and possibly a Data Network (DN) 185*a,* 185*b.* While the foregoing elements are depicted as part of the CN 106, it will be appreciated that any of these elements may be owned and/or operated by an entity other than the CN operator.

The AMF 182*a,* 182*b* may be connected to one or more of the gNBs 180*a,* 180*b,* 180*c* in the RAN 104 via an N2 interface and may serve as a control node. For example, the AMF 182*a,* 182*b* may be responsible for authenticating users of the WTRUs 102*a,* 102*b,* 102*c,* support for network slicing (e.g., handling of different protocol data unit (PDU) sessions with different requirements), selecting a particular SMF 183*a,* 183*b,* management of the registration area, termination of non-access stratum (NAS) signaling, mobility management, and the like. Network slicing may be used by the AMF 182*a,* 182*b* in order to customize CN support for WTRUs 102*a,* 102*b,* 102*c* based on the types of services being utilized WTRUs 102*a,* 102*b,* 102*c.* For example, different network slices may be established for different use cases such as services relying on ultra-reliable low latency (URLLC) access, services relying on enhanced massive mobile broadband (eMBB) access, services for MTC access, and the like. The AMF 182*a,* 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a,* 183*b* may be connected to an AMF 182*a,* 182*b* in the CN 106 via an N11 interface. The SMF 183*a,* 183*b* may also be connected to a UPF 184*a,* 184*b* in the CN 106 via an N4 interface. The SMF 183*a,* 183*b* may select and control the UPF 184*a,* 184*b* and configure the routing of traffic through the UPF 184*a,* 184*b.* The SMF 183*a,* 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a,* 184*b* may be connected to one or more of the gNBs 180*a,* 180*b,* 180*c* in the RAN 104 via an N3 interface, which may provide the WTRUs 102*a,* 102*b,* 102*c* with access to packet-switched networks, such as the Internet 110, to facilitate communications between the WTRUs 102*a,* 102*b,* 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a,* 102*b,* 102*c* with access to the other networks 112, which may include other wired and/or wireless networks that are owned and/or operated by other service providers. In one embodiment, the WTRUs 102*a,* 102*b,* 102*c* may be connected to a local DN 185*a,* 185*b* through the UPF 184*a,* 184*b* via the N3 interface to the UPF 184*a,* 184*b* and an N6 interface between the UPF 184*a,* 184*b* and the DN 185*a,* 185*b.*

In view of FIGS. 1A-1D, and the corresponding description of FIGS. 1A-1D, one or more, or all, of the functions described herein with regard to one or more of: WTRU 102*a-d,* Base Station 114*a-b,* eNode-B 160*a-c,* MME 162, SGW 164, PGW 166, gNB 180*a-c,* AMF 182*a-b,* UPF 184*a-b,* SMF 183*a-b,* DN 185*a-b,* and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

According to the following disclosure, Conditional Handover (CHO) may differ from legacy handover in at least two main aspects. In one aspect, multiple handover targets may be prepared, as compared to only one target in legacy cases. For example, a WTRU may be configured to ultimately execute a CHO command toward one of multiple possible target cells as opposed to just one. In another aspect, the WTRU may not immediately execute the CHO as in the case of the legacy handover. Instead, the WTRU may be configured with triggering conditions and/or a set of radio conditions, and the WTRU may execute the handover towards one of the targets when/if the triggering conditions are fulfilled.

In some cases, a network node may send a CHO command when radio conditions towards the current serving cells are still favorable, thereby reducing two points of failure in legacy handover procedures: (1) failure by the WTRU to send one or more measurement reports to the network (e.g. if the link quality to the current serving cell falls below acceptable levels when the measurement reports are triggered in normal handover); and (2) failure by the WTRU to receive a handover command (e.g. if the link quality to the current serving cell falls below acceptable levels after the WTRU has sent the measurement report, but before it has received the handover command).

Triggering conditions for a CHO may be based on the radio quality of the serving cells and neighbor cells, similar to the conditions that are used in legacy procedures for triggering measurement reports. For example, a WTRU could be configured with a CHO configuration that specifies triggering conditions and an associated HO command. The triggering conditions may refer to conditions that may be associated with a specific measurement reporting event. For example, event "A3" may refer to the scenario where a neighbor cell has a signal quality that exceeds a signal quality of a primary serving cell by at least a predefined amount. In another example, event "A5" may refer to the scenario where a neighbor cell has a signal quality that reaches or exceeds a predefined threshold and where a primary serving cell has a signal quality that is at or below a predefined threshold. In some scenarios, the WTRU may be configured to send a measurement report indicating the signal quality of the neighbor cell and, possibly, the signal quality of the primary serving cell. In some scenarios, the WTRU may monitor the current neighboring and serving cells and, different from some legacy procedures, when the triggering conditions are fulfilled (e.g., events A3 or A5 occur), it may, instead of sending a measurement report, execute the associated HO command and switch its connection towards the target cell.

In some scenarios, a source node may transmit a CHO request to another, potential target node. Upon receiving a message from the potential target node acknowledging the CHO request, the source node may transmit a configuration message indicating the CHO configuration to the WTRU. The message received from the potential target node may include information indicating the CHO configuration, or a subset of the parameters to be included in the CHO configuration, to be sent to the WTRU.

Figure 2:
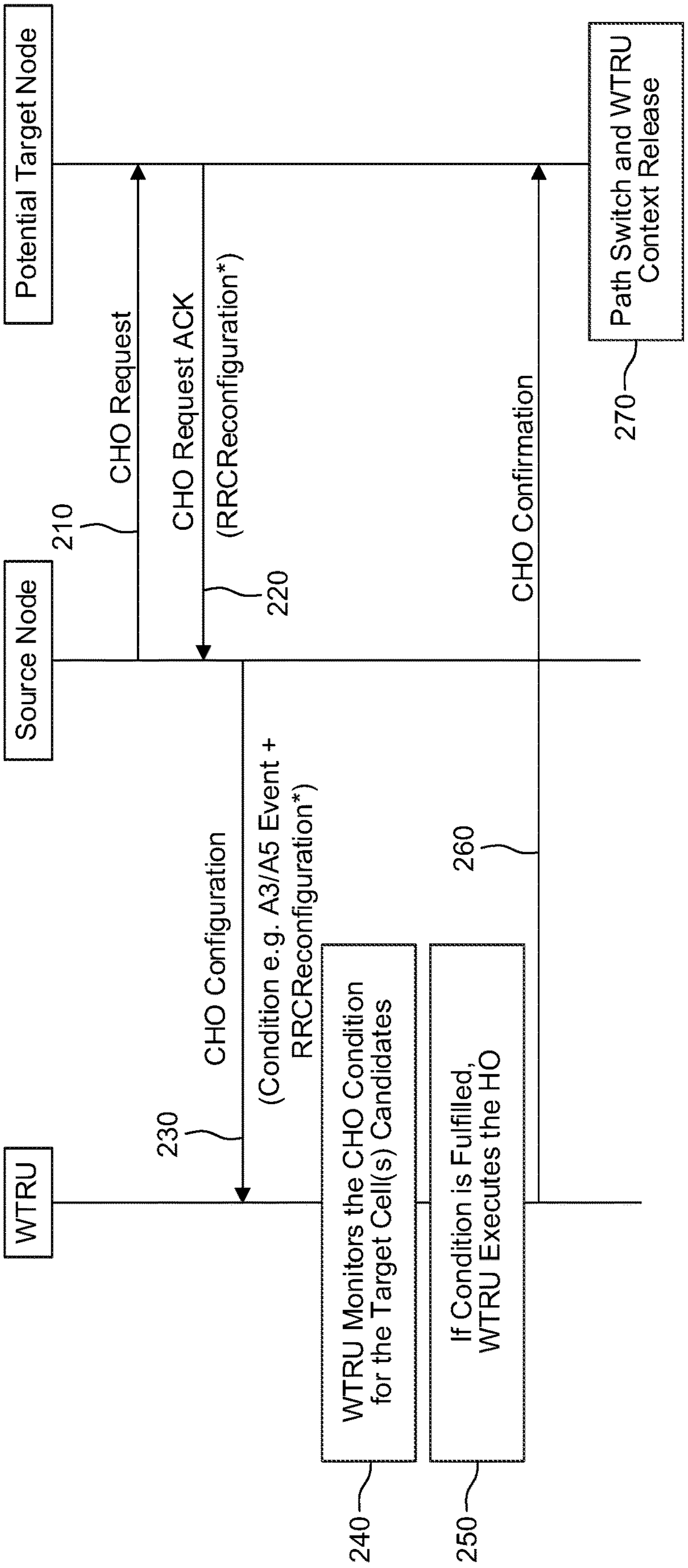
FIG. 2 is a signaling diagram illustrating an exemplary procedure for conditional handover configuration and execution.

FIG. 2 is a signaling diagram illustrating an exemplary procedure for conditional handover configuration and execution. As illustrated in FIG. 2 at element 210, the source node may transmit a CHO request to the potential target node. The source node may receive, in response to the CHO request, a CHO request acknowledgment 220 that includes an RRCReconfiguration message. Upon receiving the CHO request acknowledgement 220, the source node may transmit a CHO configuration message 230 to the WTRU, which may include the RRCReconfiguration message and may specify one or more conditions. The conditions may include, for example, conditions associated with a measurement event (e.g., event A3 or A5). As shown at 250, if one or more of the conditions specified by the CHO configuration are fulfilled, the WTRU may execute the CHO toward the potential target node. The WTRU may transmit a CHO confirmation message 260 towards the potential target node. At 270, the target node, having received the CHO confirmation message 260, may initiate a path switch and context release procedure to establish a WTRU-associated signaling connection with the network and release the network resources at the source that are associated with the WTRU.

A benefit of CHO is that it may help to prevent unnecessary re-establishments in case of a radio link failure. For example, this may occur in cases where the WTRU is configured with multiple CHO targets and the WTRU experiences RLF before the triggering conditions associated with any of the targets are fulfilled. Legacy procedures may result in RRC re-establishment procedures that may incur considerable interruption time for the bearers of the WTRU. However, in the case of CHO, if the WTRU, after detecting an RLF, has a target cell for which it has an associated CHO configuration (i.e. the target cell is already prepared for execution of a HO command), the WTRU may execute the HO command associated with this target cell directly, instead of continuing with the full re-establishment procedure.

Conditional PSCell change (CPC) and conditional PSCell addition (CPA) may be considered extensions of CHO, but may more specifically concern Dual Connectivity (DC) scenarios. A WTRU may be configured with triggering conditions for PSCell change or PSCell addition, and when the triggering conditions are fulfilled, the WTRU may execute the associated PSCell change or PSCell addition commands.

Several problems for which solutions are proposed herein may be described as follows.

In a first problem, a CHO target cell may not be the "best" cell when the triggering conditions are fulfilled. A Rel-16 CHO procedure may provide the network with a mechanism to prepare several target cells/nodes and let the WTRU handover to them when the triggering conditions are fulfilled. The more target cells are prepared, the higher the likelihood may be that RLF or handover failure (HOF) are prevented, and the WTRU may connect to a "better" cell or to the "best" target cell. However, preparing a multitude of target cells may be resource intensive as each target may need to reserve resources required to accommodate the WTRU's bearers the entire time the WTRU is monitoring the triggering conditions. Thus, the network may compromise and limit the number of CHO targets, depending on the load conditions at the moment.

Due to practical limitations on the number of CHO targets that can be prepared for a given WTRU, it is possible that when the triggering conditions for a CHO are fulfilled and the CHO is to be executed, the CHO target cell may not be the best cell for the WTRU at that time. For example, there may be a "better" (or "best") neighbor cell that the WTRU could have connected to instead, as the CHO targets may be have been chosen based on earlier measurement reports The "better" cell may be a cell for which the WTRU observes a stronger signal quality. The "best" cell may be or a cell for which the WTRU observes a strongest signal quality. For instance, a WTRU may be operating in the vicinity of three or more cells (i.e., a serving cell associated with a serving node, a second cell associated with a second node, and a third cell associated with a third node). At a first point in time $t_1$, the WTRU may be configured for CHO such that the second cell is considered a CHO target while the third cell is not considered a CHO target due to poorer radio conditions as observed by the WTRU at that time. At time $t_2$, the WTRU may have become repositioned such that it has remained within the vicinity of the second cell, but may observe better radio conditions with the third cell than with the second cell. Thus, the end result may be that the WTRU may initially execute the CHO towards the target (i.e., the second cell), send a measurement report indicating the better or best cell (i.e., the third cell) to the network after a certain duration, and be handed over to the "better" or "best" cell (the third cell). If this occurs frequently, it may not only increase the total number of HOs and signaling in the network, but could also degrade WTRU performance, as each HO may incur a period of service interruption.

In a second problem, re-establishment may be triggered during RLF detection even if there may be a good CHO target that may not have fulfilled the CHO conditions, as long as there is a non-target cell that has even marginally better conditions.

As mentioned substantially in paragraphs above, if a WTRU detects RLF while monitoring CHO triggering conditions and re-selects to a cell that belongs to one of the CHO targets, it may execute the CHO towards that target. However, if the WTRU performs re-selection to a cell different from the CHO target, normal re-establishment may be performed. However, it is possible that the radio conditions towards one or more of the CHO target cells may have been good enough at that time to serve the WTRU (at least temporarily), even though they do not fulfill the CHO trigger conditions. This could especially be detrimental in scenarios like Integrated Access Backhaul (IAB) or Sidelink relaying, where an IAB node or sidelink relay node may be the entity that is involved in the HO and either may be serving a multitude of WTRUs (or even other IAB nodes or relays, in a multi-hop scenario). In such cases, there may be a strong incentive to prevent the IAB node or sidelink relay node from performing re-establishments, as re-establishment may trigger a cascade of re-establishments of the WTRUs that are directly connected to the IAB node or relay, or even other nodes/relays/WTRUs further down the path in the case of multi-hop scenarios.

Methods for CHO enhancement are described herein. One or more of such methods may be generally understood as follows.

In some solutions involving sending of measurements instead of performing or in addition to performing CHO execution, a WTRU that is operating in CONNECTED mode may do one or more of the following. A WTRU may receive information indicating one or more conditional handover (CHO) configurations, where a CHO configuration may include: a list of candidate cells and CHO trigger conditions to perform the HO towards the corresponding CHO candidate cell. The trigger conditions may be, e.g., based on an absolute radio signal levels, relative signal levels as compared to the serving cell, or other measurements. The WTRU may receive information indicating one or more cells for which to perform measurements, and such cells may be non-candidate cells (i.e., the cells may not belong to the list of CHO candidate cells).

The WTRU may receive information indicating one or more measurement configurations that specify trigger conditions that are related to the non-candidate cells. The trigger conditions may be based on, e.g. absolute radio signal levels, relative signal levels as compared to the serving cells, relative signal levels as compared to CHO candidate cells, relative signal levels as compared to CHO candidate cells and serving cells, or other measurements.

The WTRU may receive information indicating one or more threshold values related to the serving cell, indicating eligibility for sending measurement reports. The WTRU may monitor the CHO trigger conditions. If the CHO trigger conditions are fulfilled, the WTRU may check to see if the measurement trigger conditions are fulfilled for any of the non-candidate cells. If the measurement trigger conditions are not fulfilled or the serving cell does not fulfill the measurement reporting eligibility threshold, the WTRU may execute the HO towards the CHO candidate cell that fulfilled the trigger conditions.

In some instances, if the measurement trigger conditions are fulfilled for a non-candidate cell and the serving cell fulfills the measurement reporting eligibility threshold, the WTRU may do one or more of the following: refrain from executing the HO and sends the measurement report instead; and/or WTRU execute the HO command. When executing the HO command, the WTRU may include the measurement report in the HO complete message.

Some solutions may involve a WTRU performing a CHO towards a candidate that may have not fulfilled the CHO conditions to prevent re-establishment. A WTRU that is operating in CONNECTED mode, may perform one or more of the following steps. The WTRU may receive information indicating one or more conditional handover (CHO) configurations, where a CHO configuration may include: one or more candidate cells and CHO trigger conditions to perform the HO command towards the corresponding CHO candidate cell. The trigger conditions may be, e.g., based on absolute radio signal levels, relative signal levels as compared to the serving cell, or other measurements. The CHO configuration may include additional trigger conditions to be used in case of failure (e.g. failure of a radio link to a candidate cell or failure of a HO towards a candidate cell that fulfilled the conditions) that may be, e.g., based on absolute radio signal levels of the candidate cell, relative radio signal levels as compared with the other candidate cells, relative radio signal level as compared with non-candidate neighbor cells, or other measurements. The CHO configuration may include information for prioritization among the different candidate cells, such as in case more than one cell satisfies the failure related condition at the same time. The information for prioritization may specify that prioritization be performed according to signal levels, an explicit priority list, based on frequency, or that the WTRU should apply random selection.

The WTRU may monitor the CHO trigger conditions. If RLF is detected for one or more cells before the CHO trigger conditions are fulfilled or after a CHO trigger condition was fulfilled for a target cell but the handover towards that candidate cell fails, the WTRU may evaluate whether the failure-related trigger conditions are fulfilled for any of the candidate cells.

If a candidate cell is not found that fulfills the failure-related trigger condition, the WTRU may perform the re-establishment procedure towards the best non-candidate neighbor cell. Otherwise, the WTRU may execute the CHO towards the candidate cell that fulfills the failure-related thresholds (or in the case of more than one candidate fulfilling the conditions, towards the chosen candidate based on the configured prioritization criteria).

As used herein, the term candidate cell may be used to refer to a neighbor cell for which a signal quality or level is being measured by the WTRU and which may also be one of the target cells in the CHO configurations that the WTRU has received/stored. As used herein, the term non-candidate cell may be used to refer to a neighbor cell that is being measured by the WTRU which is not one of the target cells in the CHO configurations that the WTRU has received/stored. As used herein, the term WTRU may be used to describe any wireless device that is communicating with a network infrastructure (either directly or via another wireless device) or with another wireless device. Some examples of this include a traditional mobile/smart phone, a laptop or computer with wireless connectivity, a sidelink WTRU acting as a WTRU-to-WTRU relay or WTRU-to-NW relay (e.g. over sidelink), an IAB node, or another device. As use herein, the term serving cell may be used to refer to a PCell.

Solutions in which conditions that take non-candidate cells into consideration are described herein. In some of these solutions, a WTRU may receive information indicating one or more CHO configurations. A CHO configuration may include additional criteria or condition(s) related to a non-candidate cell, and when such criteria or condition(s) are fulfilled, the WTRU may send a measurement report instead of executing a HO command associated with the CHO configuration.

In some of these solutions, the WTRU may send the measurement report at any time if/when trigger conditions related to non-candidate cells are fulfilled.

In some of these solutions, the WTRU may evaluate the trigger conditions related to the sending of the measurement report only when the trigger conditions related to the execution of the CHO are fulfilled. That is, when the CHO conditions are fulfilled, the WTRU may evaluate whether the trigger conditions related to non-candidate cells are also fulfilled or not. If they are, a measurement report may be sent. If not, the CHO may be executed as in a legacy CHO procedure.

Additional criteria related to non-candidate cells may include one or more of the following: an absolute radio condition of a non-candidate cell (e.g. RSRP/RSRQ of a non-candidate cell is above a certain threshold), or a relative radio condition of a non-candidate cell. An evaluation of a relative radio condition could be based on a one or more of: a comparison with the serving cell (e.g. RSRP/RSRQ of a non-candidate cell is better than the current serving cell's RSRP/RSRQ by a certain threshold), or a comparison with one of the candidate cells (e.g. RSRP/RSRQ of a non-candidate cell is better than a candidate cell's RSRP/RSRQ by a certain threshold).

Additional criteria related to non-candidate cells could include a combination of different relative and absolute conditions such as: a condition that an RSRP/RSRQ of a non-candidate cell is above the current serving cell's RSRP/RSRQ by a first threshold or the RSRP/RSRQ of the non-candidate cell is above a candidate cell's RSRP/RSRQ by a second threshold; a condition that an RSRP/RSRQ of a non-candidate cell is above the current serving cell's RSRP/RSRQ by a first threshold and the RSRP/RSRQ of the non-candidate cell is above a candidate cell's RSRP/RSRQ by a second threshold; a condition that an RSRP/RSRQ of a non-candidate cell is above a first threshold or the RSRP/RSRQ of the non-candidate cell is above the serving cell's RSRP/RSRQ by a second threshold; a condition that an RSRP/RSRQ of a non-candidate cell is above a first threshold or the RSRP/RSRQ of the non-candidate cell is above a candidate cell's RSRP/RSRQ by a second threshold; a condition that an RSRP/RSRQ of a non-candidate cell is above a first threshold and the RSRP/RSRQ of the non-candidate cell is above the serving cell's RSRP/RSRQ by a second threshold; or a condition that an RSRP/RSRQ of a non-candidate cell is above a first threshold and the RSRP/RSRQ of the non-candidate cell is above a candidate cell's RSRP/RSRQ by a second threshold.

The first and second thresholds may be the same or different thresholds. The thresholds may be common for all CHO configurations or specific to a given CHO configuration. The thresholds may be specific to a given candidate cell, or common to all candidate cells, or common to a specific subset of the candidate cells. The candidate cell to be compared with the non-candidate cell could be a specific candidate cell, any of the candidate cells, or all of the candidate cells. For example, in the latter case (i.e. when all candidate cells are compared with the non-candidate cell), the non-candidate cell must have radio conditions better than all of the candidate cells by a second threshold.

In some solutions, instead of sending a full measurement report, the WTRU may send an indication that there is a better cell. This indication may also include the identity (e.g. PCI) of that cell. The indication may be included in a message sent by the WTRU, such as a CHO complete message, or another logically equivalent message.

Embodiments directed to configuration of non-candidate cells are described herein. In some of such embodiments, a non-candidate cell may be any neighbor cell that the WTRU can measure/detect signals and that is not a CHO target cell.

In some solutions, the WTRU may receive information explicitly configuring which cell(s) to consider as a non-candidate cell. For example, a WTRU may be provided with an indication of one or more cells (referred to herein as a "list" of cells, or a "list" of PCIs) that it should consider as non-candidate cells. The WTRU may be provided with a list of cells (e.g. list of PCIs) that it should not consider as non-candidate cells. The WTRU may be provided with an indication or list of one or more frequencies, and only cells that are operating at the indicated frequencies may be considered as non-candidate cells. The WTRU may be provided with an indication or list of one or more frequencies, and only cells that are not operating at the indicated frequencies should be considered as non-candidate cells.

In some solutions, the CHO configuration may include information about the list of non-candidate cells. In some solutions, the list of non-candidate cells may be provided separately from the CHO configuration (e.g. via a separate RRC Reconfiguration message, System information broadcast signaling, or another logically equivalent message).

In some solutions, the list of non-candidate cells may be applicable to all CHO configurations. In some solutions, the list of non-candidate cells may be specific to a given CHO configuration. In some solutions, there may be a list of non-candidate cells that is applicable to all CHO configurations, and there may be some lists that are applicable only to specific CHO configurations.

In solutions described herein, the conditions related to non-candidate cells may be applicable to all the non-candidate cells, or some conditions may be specific to a sub-set of the non-candidate cells. For example, the WTRU may be configured with one or more thresholds or sets of thresholds related to non-candidate cells on frequency FR1 and another one or more thresholds or sets of thresholds related to non-candidate cells on frequency FR2. The WTRU may be configured with a list of candidate cells specific to each CHO configuration, along with the thresholds or set of thresholds related to those cells.

Embodiments directed to handling of the CHO configurations after measurement reporting are described herein. In some solutions, the WTRU may maintain CHO configurations after sending the measurement report. In some solutions, the WTRU may release CHO configurations after sending the measurement report. In some solutions, the WTRU may release one or more CHO configurations related to the non-candidate cell that triggered the measurement report (e.g., in case the concerned non-candidate cell is specific to a specific CHO configuration) but maintain other CHO configurations. In some solutions, the WTRU may maintain the CHO configuration related to the non-candidate cell that triggered the measurement report (for example, in case the concerned non-candidate cell is specific to a specific CHO configuration) but may release other CHO configurations.

Embodiments directed to trigger conditions that take serving cells' radio conditions into consideration are described herein. In some solutions, the sending of the measurement report may also be constrained by the current serving cell's radio condition. For example, the WTRU may be configured to send the measurement report if the serving cell's RSRP/RSRQ is above a certain threshold. Such a constraint may prevent the WTRU from trying to send the measurement report to the source if the radio conditions towards the source are not good enough to do so (and in which case, executing the CHO may be the best decision, even though the target cell may not be the best cell at that point).

Embodiments involving sending of measurement report along with a HO complete message towards a target are described herein. In some solutions, a WTRU may be configured with a CHO configuration that includes additional criteria and is dependent on the conditions of a non-candidate cell, and when the CHO triggering conditions are fulfilled, the WTRU may further evaluate whether the additional criteria are fulfilled. If so, the WTRU may execute the CHO and also send a measurement report that includes the measurements related to the concerned non-candidate cells.

In some solutions, instead of a full measurement report, the WTRU may send a message including an indication that there is a better cell. This indication may also include the identity (e.g. PCI) of that cell. In some solutions, the measurement report or the indication that there is a better cell may be sent in a separate message after the HO complete message to the target. In some solutions, the measurement report or the indication that there is a better cell may be included in the HO complete message to the target.

Embodiments directed to prevention of unnecessary re-establishment procedures are described herein. In some solutions, a WTRU may be configured with or receive information indicating additional criteria related to CHO target cells that is to be checked when the WTRU detects RLF. If the criteria is fulfilled, the WTRU may execute the HO to the target cell that fulfills the conditions, instead of performing re-establishment. The additional criteria related to CHO target cells could include one or more of the following: an absolute radio condition associated with the CHO target cell (e.g. if RLF is detected and the RSRP/RSRQ of the CHO target cell is above a certain threshold, the WTRU may execute the associated HO instead of performing a re-establishment); or a relative radio condition of the CHO target cell. The relative radio condition may provide for: a comparison with other CHO target cells (e.g. whether an RSRP/RSRQ of the CHO target cell is better than all other CHO targets by a certain threshold); a comparison with a neighbor cell (e.g. whether an RSRP/RSRQ of the CHO target cell is not worse than the best neighbor cell by more than a certain threshold); or a comparison with one of the non-candidate cells (e.g. whether an RSRP/RSRQ of the CHO target cell is not worse than the best non-candidate cell by more than a certain threshold). A combination of different relative and absolute conditions may also be implemented. For example, the criteria could be that the CHO target cell has an RSRP/RSRQ better than a first threshold, and the RSRP/RSRQ is not worse by more than second threshold as compared to the best neighbor cell. The first and second thresholds may be the same or different thresholds.

In cases in which multiple CHO target cells fulfill the condition or conditions to be evaluated during RLF, the WTRU may select the best cell among these target cells or select one of them in a random fashion. Alternatively, or additionally, the WTRU may be configured to know which CHO targets to prioritize. The prioritization could be performed in an explicit manner, or on an individual basis (e.g. a target cell X may have priority 1, a target cell Y may have priority 2, etc.), or it could be done in a generic manner, or on a group basis (e.g. priority may be given to target cells that operate in frequency range 1 (FR1)).

The additional criteria and associated threshold(s) to be evaluated when RLF is detected could be specific to each CHO configuration or candidate cell, or the additional criteria and associated threshold(s) may be applicable to all CHO configurations or candidate cells.

FIGS. 3-7 are flowcharts illustrating example solutions according to one or more of the various embodiments described herein.

Figure 3:
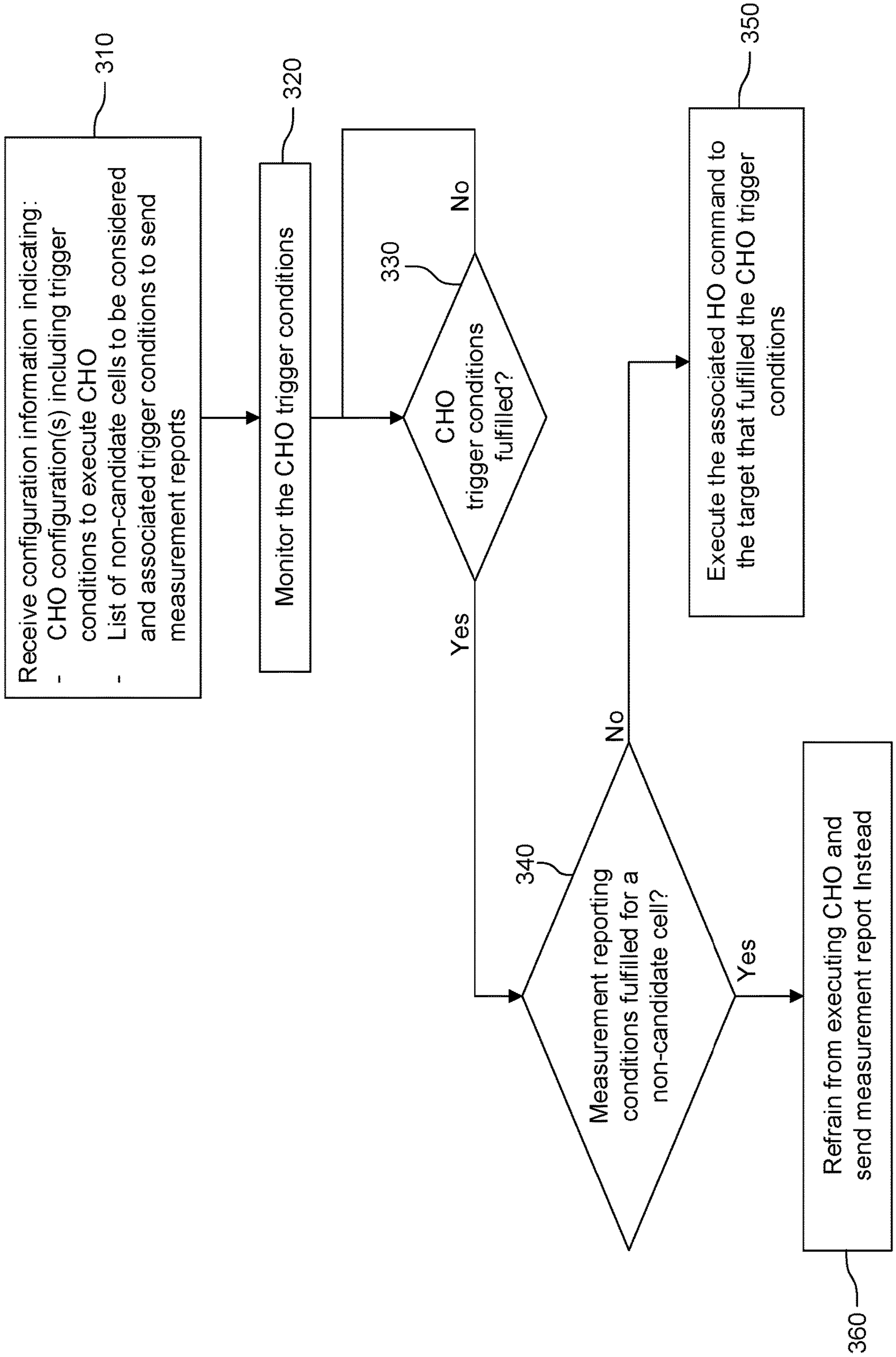
FIG. 3 is a flowchart illustrating an exemplary solution where a WTRU transmits measurement reports instead of executing a CHO command.

FIG. 3 is a flowchart illustrating an exemplary solution where a WTRU transmits measurement reports instead of executing a CHO command (e.g., where the measurement report conditions are evaluated/monitored only after the CHO conditions are fulfilled). As shown in FIG. 3, at 310, a WTRU may receive configuration information indicating one or more CHO configurations. The one or more CHO configurations may include trigger conditions for executing a CHO command associated with one or more of the CHO configurations. The WTRU may also receive an indication of one or more non-candidate cells for CHO and associated trigger conditions for sending measurement reports. As shown at 320, the WTRU may monitor the CHO trigger conditions. At 330, if the WTRU determines the CHO trigger conditions are fulfilled, the WTRU may evaluate whether measurement reporting conditions are fulfilled for one or more non-candidate cells, shown at 340. If not, at 350, the WTRU may execute the associated CHO command towards a target cell that fulfilled the CHO trigger conditions. On the other hand, at 360, if the measurement reporting conditions are fulfilled for one or more non-candidate cells, then the WTRU may refrain from executing the CHO and send at least one measurement report including measurements for the one or more non-candidate cells that fulfilled the measurement reporting conditions.

Figure 4:
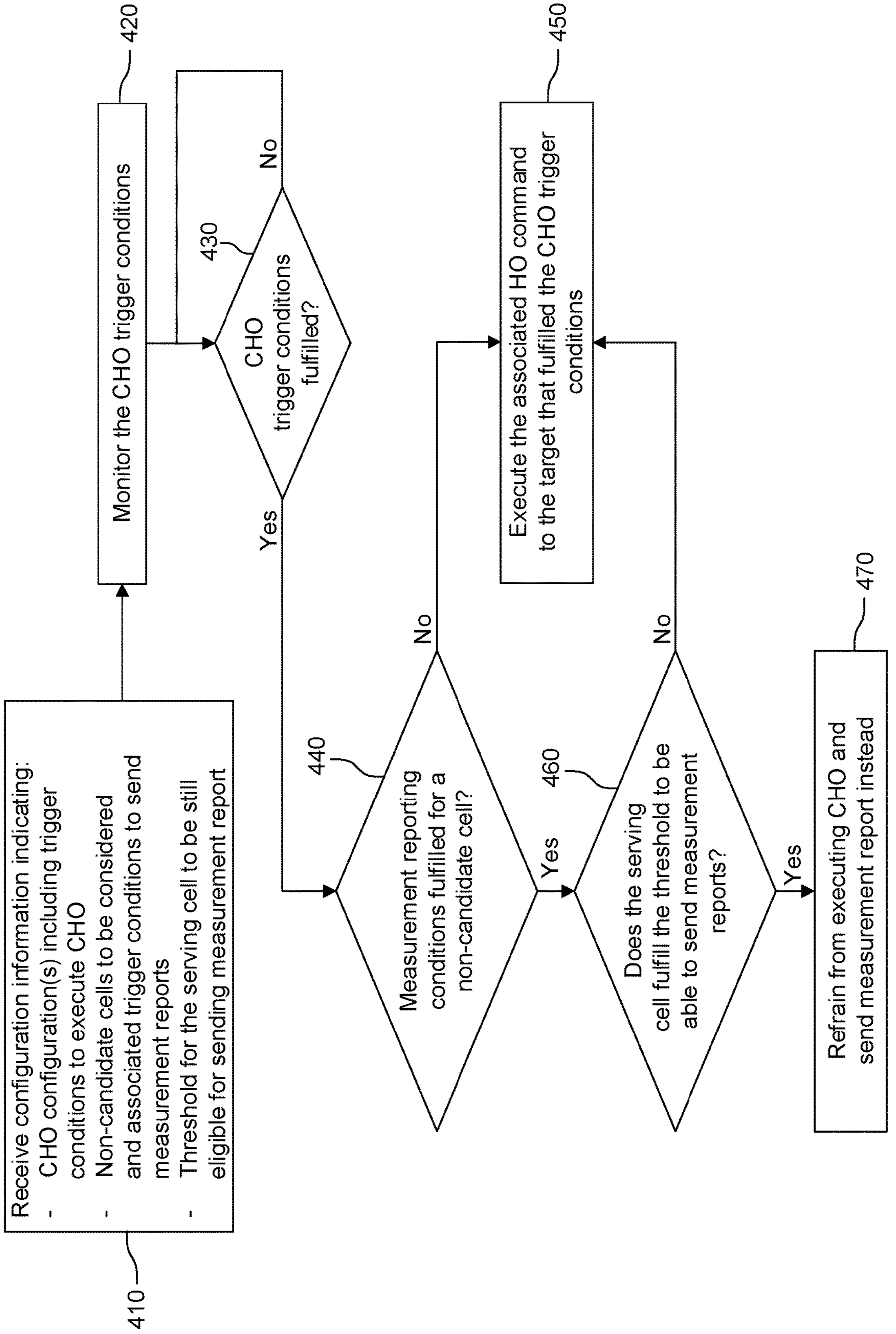
FIG. 4 is flowchart illustrating another exemplary solution where a WTRU transmits measurement reports instead of executing the CHO command.

FIG. 4 is flowchart illustrating another exemplary solution where a WTRU transmits measurement reports instead of executing the CHO command (e.g., where the measurement report conditions are evaluated/monitored only after the CHO conditions are fulfilled). As shown in FIG. 4, at 410, a WTRU may receive configuration information indicating one or more CHO configurations. The one or more CHO configurations may include trigger conditions for executing a CHO command associated with one or more of the CHO configurations. The WTRU may receive an indication of one or more non-candidate cells for CHO and associated trigger conditions for sending measurement reports. As compared to the example shown in FIG. 3, in the example shown in FIG. 4, an additional evaluation may be made whether the serving cell's radio conditions are good enough to proceed with sending a measurement report or whether the CHO command should be executed instead. Hence, in addition to receiving information indicating the one or more CHO configurations, the WTRU may also receive information indicating a threshold for evaluating the serving cell's radio conditions. As shown at 420, the WTRU may monitor the CHO trigger conditions. At 430, if the WTRU determines the CHO trigger conditions are fulfilled, the WTRU may evaluate whether measurement reporting conditions are fulfilled for one or more non-candidate cells, shown at 440. If not, at 450, the WTRU may execute the associated CHO command towards a target cell that fulfilled the CHO trigger conditions. On the other hand, at 460, if the measurement reporting conditions are fulfilled for one or more non-candidate cells, then the WTRU may evaluate whether the serving cell meets or exceeds the indicated threshold such that the WTRU should send a measurement report. If so, at 470, the WTRU refrains from executing the CHO and sends at least one measurement report including measurements for the one or more non-candidate cells that fulfilled the measurement reporting conditions.

Figure 5:
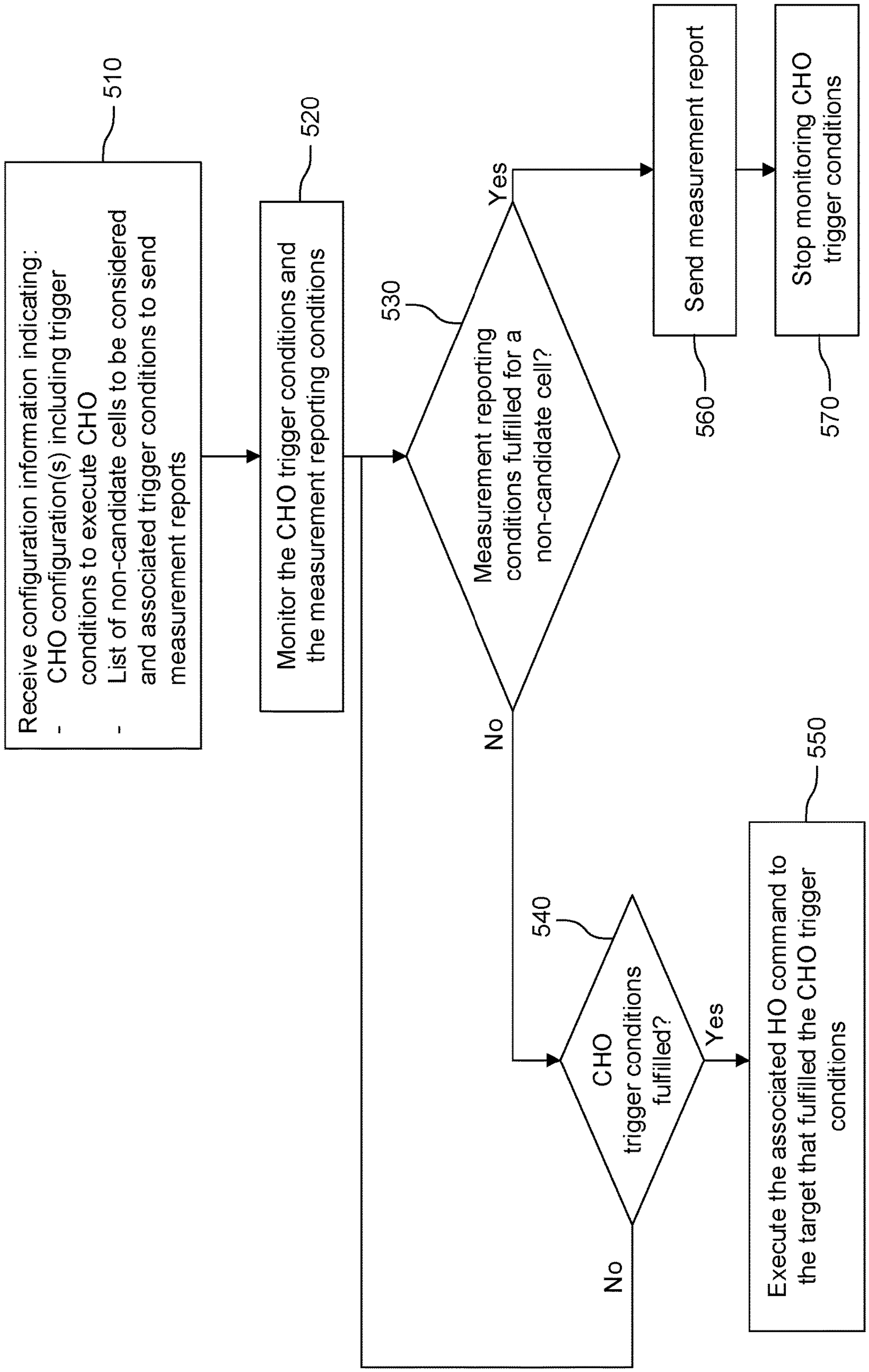
FIG. 5 is a flowchart illustrating another exemplary solution in which a WTRU may transmit measurement reports instead of executing the CHO (e.g., where measurement reporting conditions are evaluated/monitored at all times)

FIG. 5 is a flowchart illustrating another exemplary solution in which a WTRU may transmit measurement reports instead of executing the CHO (e.g., where measurement reporting conditions are evaluated/monitored at all times). As shown in FIG. 5, at 510, a WTRU may receive configuration information indicating one or more CHO configurations. The one or more CHO configurations may include trigger conditions for executing a CHO command associated with one or more of the CHO configurations. The WTRU may also receive an indication of one or more non-candidate cells for CHO and associated trigger conditions for sending measurement reports. As shown at 520, the WTRU may monitor both the CHO trigger conditions and the trigger conditions for sending measurement reports. At 530, if the WTRU determines the trigger conditions for measurement reporting are fulfilled for a non-candidate cell, at 560, the WTRU may send at least one measurement report, which may include measurements for the one or more non-candidate cells that fulfilled the measurement reporting conditions. At 570, the WTRU may stop monitoring the CHO trigger conditions.

If the trigger conditions for measurement reporting are not fulfilled for a non-candidate cell, at 540, the WTRU may evaluate whether the CHO trigger conditions are fulfilled. If not, the WTRU may again continue evaluating whether the measurement reporting conditions are fulfilled for a non-candidate cell, as shown at 530. If CHO trigger conditions are fulfilled, the WTRU may execute the associated CHO command towards a target cell that fulfilled the CHO trigger conditions, as shown at 550. It should be noted that the same additional criteria as described above with respect to FIG. 4 concerning the serving cell's radio conditions may be further considered before the WTRU determines to send the measurement report.

Figure 6:
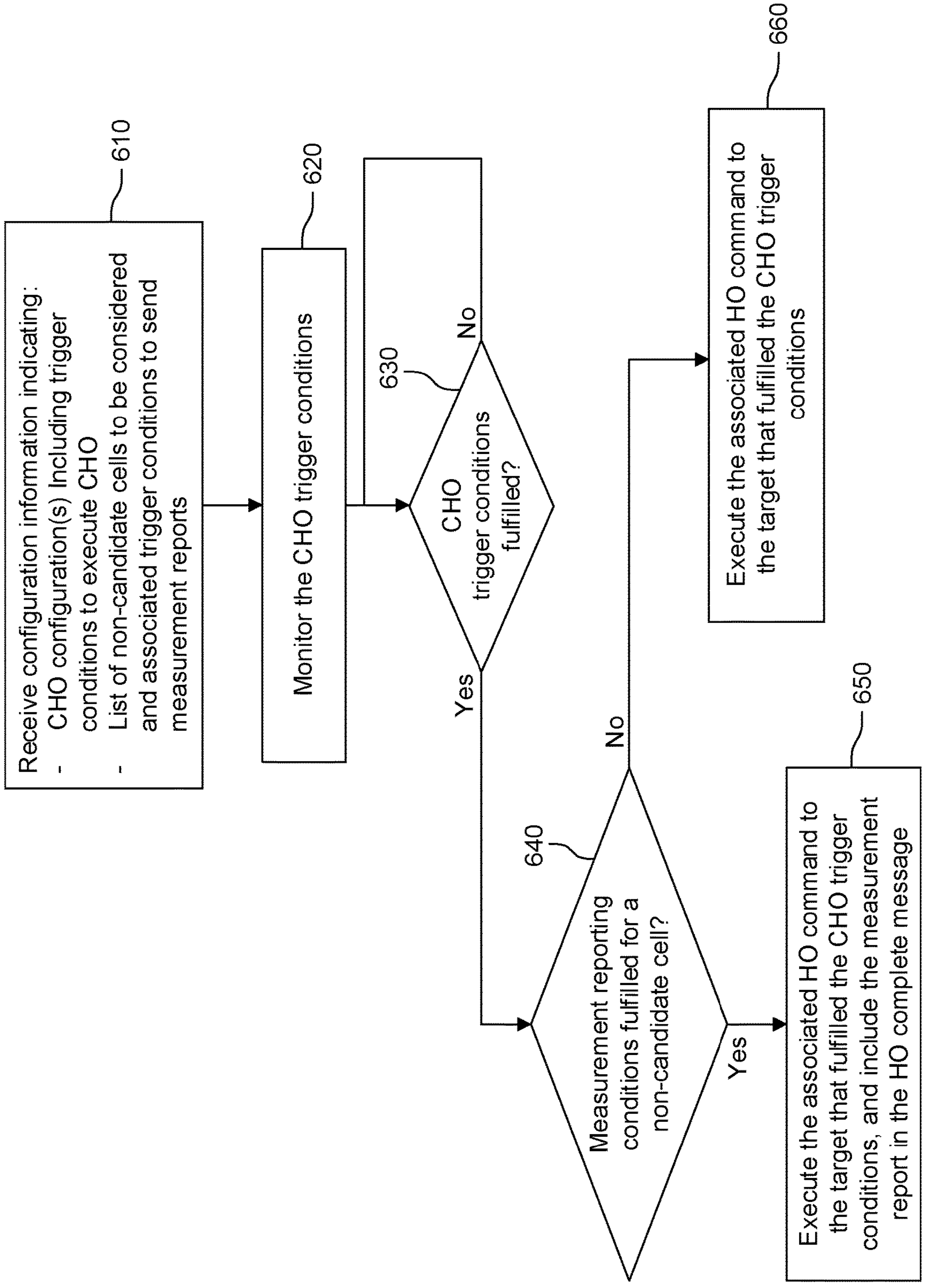
FIG. 6 is a flowchart illustrating a solution in which the WTRU executes a CHO command and sends a measurement report in a CHO complete message.

FIG. 6 is a flowchart illustrating a solution in which the WTRU executes a CHO command and sends a measurement report (e.g., in a CHO complete message). As shown in FIG. 6, at 610, a WTRU may receive configuration information indicating one or more CHO configurations. The one or more CHO configurations may include trigger conditions for executing a CHO command associated with one or more of the CHO configurations. The WTRU may also receive an indication of one or more non-candidate cells for CHO and associated trigger conditions for sending measurement reports. As shown at 620, the WTRU may monitor the CHO trigger conditions. At 630, if the WTRU determines the CHO trigger conditions are fulfilled, the WTRU may evaluate whether measurement reporting conditions are fulfilled for one or more non-candidate cells, shown at 640. If not, at 650, the WTRU may execute the associated HO command towards a target cell that fulfilled the CHO trigger conditions. On the other hand, at 660, if the measurement reporting conditions are fulfilled for one or more non-candidate cells, then the WTRU execute the CHO and send a CHO complete message including a measurement report. The measurement report may include, for example, measurements for the one or more non-candidate cells that fulfilled the measurement reporting conditions.

Figure 7:
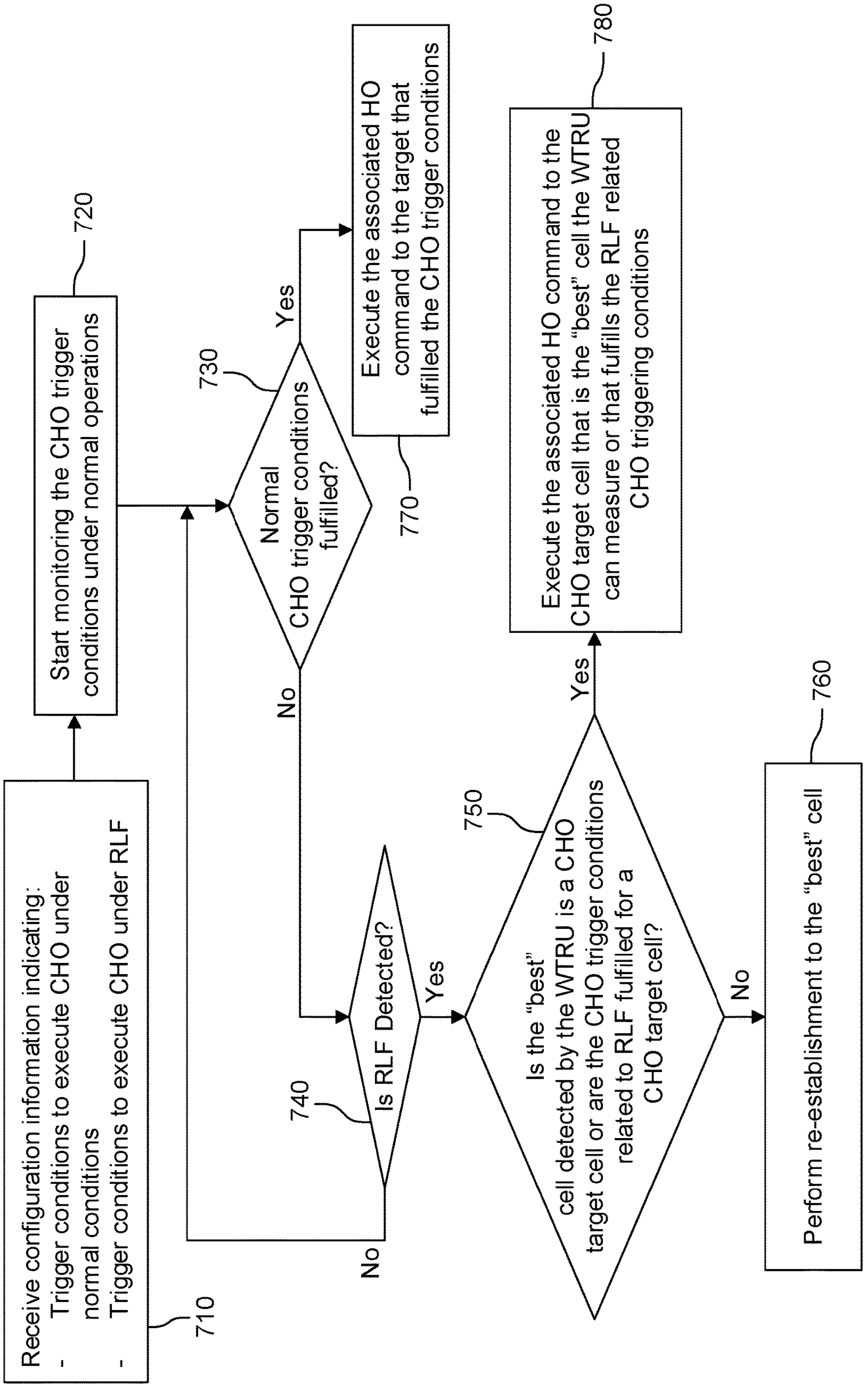
FIG. 7 is a flowchart illustrating a solution for to RLF-based CHO triggering.

FIG. 7 is a flowchart illustrating a solution for to RLF-based CHO triggering. As shown in FIG. 7, at 710, a WTRU may receive configuration information indicating one or more CHO configurations. The one or more CHO configurations may include trigger conditions for executing a CHO command under normal conditions. Normal conditions may refer to radio conditions under which the WTRU does not experience RLF with a serving cell. The one or more CHO configurations may include trigger conditions for executing a CHO command under RLF failure, i.e., when RLF occurs for a serving cell. As shown at 720, the WTRU may monitor the CHO trigger conditions. At 730, the WTRU may evaluate whether the CHO trigger conditions are fulfilled under normal radio conditions. If the CHO trigger conditions are fulfilled under normal radio conditions, at 770, the WTRU may execute the associated CHO command to the target cell for which the CHO trigger conditions were fulfilled. On the other hand, at 740, if the CHO trigger conditions are not fulfilled under normal radio conditions, the WTRU may evaluate whether RLF is detected. If RLF is not detected, the WTRU may continue to evaluate whether the CHO trigger conditions are fulfilled. If RLF is detected, at 750 the WTRU may evaluate whether the "best" cell detected by the WTRU is a CHO target cell, or if the CHO trigger conditions related to RLF are fulfilled for a CHO target cell. If so, at 780, the WTRU may execute the associated CHO command to the CHO target cell that is the "best" cell the WTRU can measure, or a cell that fulfills the RLF-related CHO triggering conditions. If the "best" cell detected by the WTRU is not a CHO target cell, or if the CHO trigger conditions related to RLF are not fulfilled for a CHO target cell, the WTRU may perform re-establishment to the "best cell," shown at 760. As used herein, the term "best cell" may refer to a cell detected by the WTRU having the highest measured signal quality.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

What is claimed is:

1. A wireless transmit/receive unit (WTRU), the WTRU comprising:

a processor; and a transceiver;

the transceiver configured to receive a message including conditional handover (CHO) configuration information, the CHO configuration information identifying one or more CHO candidate cells and the CHO configuration information indicating:

one or more CHO trigger conditions associated with the one or more CHO candidate cells, one or more measurement trigger conditions associated with one or more non-CHO candidate cells, and measurement reporting eligibility criteria associated with a serving cell;

on a condition that a CHO trigger condition associated with at least one of the one or more CHO candidate cells is fulfilled, at least one of the one or more measurement trigger conditions associated with one or more non-CHO candidate cells is fulfilled, and the serving cell does not meet the measurement reporting eligibility criteria:

the processor and the transceiver are configured to execute a handover procedure towards the CHO candidate cell for which the CHO trigger condition is fulfilled; and the processor and the transceiver are configured to send, to a network node associated with the CHO candidate cell, a message indicating completion of the handover procedure and reporting a measurement of a signal associated with the one or more of the non-CHO candidate cells.

2. The WTRU of claim 1, the transceiver is configured to receive a message from a network node instructing the WTRU to execute a handover procedure toward the non-CHO candidate cell for which the measurement of the signal is reported, and the processor and the transceiver configured to execute the handover procedure toward the non-CHO candidate cell in response to the received message from the network node.

3. The WTRU of claim 1, wherein a measurement trigger condition associated with at least one of the one or more non-CHO candidate cells is fulfilled when a signal quality associated with one or more non-CHO candidate cells exceeds a signal quality associated with each of the CHO candidate cells.

4. The WTRU of claim 1, wherein the non-CHO candidate cells are cells for which a CHO configuration has not been received.

5. The WTRU of claim 1, wherein the non-CHO candidate cells are explicitly identified in one or more received messages.

6. The WTRU of claim 1, wherein the measurement reporting eligibility criteria is met when a signal quality associated with the serving cell exceeds a threshold value.

7. The WTRU of claim 1, wherein at least one of the one or more measurement trigger conditions are met when a quality of a measured signal associated with a non-candidate cell exceeds a quality of a measured signal associated with a serving cell by a threshold value.

8. The WTRU of claim 1, wherein at least one of the one or more measurement trigger conditions are met when a quality of a measured signal associated with a non-candidate cell exceeds a quality of a measured signal associated with a CHO candidate cell by a threshold value.

9. A method performed by a wireless transmit/receive unit (WTRU), the method comprising:

receiving a message including conditional handover (CHO) configuration information, the CHO configuration information identifying one or more CHO candidate cells and the CHO configuration information indicating:

one or more CHO trigger conditions associated with the one or more CHO candidate cells, one or more measurement trigger conditions associated with one or more non-CHO candidate cells, and measurement reporting eligibility criteria associated with a serving cell;

on a condition that a CHO trigger condition associated with at least one of the one or more CHO candidate cells is fulfilled, at least one of the one or more measurement trigger conditions associated with one or more non-CHO candidate cells is fulfilled, and the serving cell does not meet the measurement reporting eligibility criteria:

executing a handover procedure towards the CHO candidate cell for which the CHO trigger condition is fulfilled; and sending, to a network node associated with the CHO candidate cell, a message indicating completion of the handover procedure and reporting a measurement of a signal associated with the one or more of the non-CHO candidate cells.

10. The method of claim 9 comprising: receiving a message from a network node instructing the WTRU to execute a handover procedure toward the non-CHO candidate cell for which the measurement of the signal is reported, and executing the handover procedure toward the non-CHO candidate cell in response to the received message from the network node.

11. The method of claim 9, wherein a measurement trigger condition associated with at least one of the one or more non-CHO candidate cells is fulfilled when a signal quality associated with one or more non-CHO candidate cells exceeds a signal quality associated with each of the CHO candidate cells.

12. The method of claim 9, wherein the non-CHO candidate cells are cells for which a CHO configuration has not been received.

13. The method of claim 9, wherein the non-CHO candidate cells are explicitly identified in one or more received messages.

14. The method of claim 9, wherein the measurement reporting eligibility criteria is met when a signal quality associated with the serving cell exceeds a threshold value.

15. The method of claim 9, wherein at least one of the one or more measurement trigger conditions are met when a quality of a measured signal associated with a non-candidate cell exceeds a quality of a measured signal associated with a serving cell by a threshold value.

16. The method of claim 9, wherein at least one of the one or more measurement trigger conditions are met when a quality of a measured signal associated with a non-candidate cell exceeds a quality of a measured signal associated with a CHO candidate cell by a threshold value.

17. A wireless transmit/receive unit (WTRU), the WTRU comprising:

a processor; and a transceiver;

the transceiver configured to receive a message including conditional handover (CHO) configuration information, the CHO configuration information identifying one or more CHO candidate cells and the CHO configuration information indicating:

one or more CHO trigger conditions associated with the one or more CHO candidate cells, one or more measurement trigger conditions associated with one or more non-CHO candidate cells, and measurement reporting eligibility criteria associated with a serving cell;

on a condition that a CHO trigger condition associated with at least one of the one or more CHO candidate cells is fulfilled, at least one of the one or more measurement trigger conditions associated with one or more non-CHO candidate cells is fulfilled, and the serving cell meets the measurement reporting eligibility criteria:

the processor and the transceiver are configured to refrain from executing a handover procedure towards the CHO candidate cell for which the CHO trigger condition is fulfilled; and the processor and the transceiver are configured to send, to a network node associated with the CHO candidate cell, a message reporting a measurement of a signal associated with the one or more of the non-CHO candidate cells.

18. The WTRU of claim 17, the transceiver is configured to receive a message from a network node instructing the WTRU to execute a handover procedure toward the non-CHO candidate cell for which the measurement of the signal is reported, and the processor and the transceiver configured to execute the handover procedure toward the non-CHO candidate cell in response to the received message from the network node.

19. The WTRU of claim 17, wherein a measurement trigger condition associated with at least one of the one or more non-CHO candidate cells is fulfilled when a signal quality associated with one or more non-CHO candidate cells exceeds a signal quality associated with each of the CHO candidate cells.

20. The WTRU of claim 17, wherein the measurement reporting eligibility criteria is met when a signal quality associated with the serving cell exceeds a threshold value.

* * * * *